Fig. 2

Feb. 21, 1967 F. R. CODY 3,305,233
EJECTOR MECHANISM FOR VACUUM CONVEYOR
Original Filed May 7, 1963 8 Sheets-Sheet 4

INVENTOR.
FREMONT R. CODY
BY
ATTORNEYS

Feb. 21, 1967    F. R. CODY    3,305,233
EJECTOR MECHANISM FOR VACUUM CONVEYOR
Original Filed May 7, 1963    8 Sheets-Sheet 5

INVENTOR.
FREMONT R. CODY
BY
ATTORNEYS

Feb. 21, 1967  F. R. CODY  3,305,233
EJECTOR MECHANISM FOR VACUUM CONVEYOR
Original Filed May 7, 1963  8 Sheets-Sheet 7

INVENTOR.
FREMONT R. CODY
BY Leslie G. Noller
Daniel C. Block
ATTORNEYS

Feb. 21, 1967  F. R. CODY  3,305,233
EJECTOR MECHANISM FOR VACUUM CONVEYOR
Original Filed May 7, 1963  8 Sheets-Sheet 8

INVENTOR.
FREMONT R. CODY
ATTORNEYS

United States Patent Office 3,305,233
Patented Feb. 21, 1967

3,305,233
EJECTOR MECHANISM FOR VACUUM
CONVEYOR
Fremont R. Cody, Tacoma, Wash., assignor to Weyerhaeuser Company, Tacoma, Wash., a corporation of Washington
Original application May 7, 1963, Ser. No. 278,558, now Patent No. 3,227,275, dated Jan. 4, 1966. Divided and this application Nov. 17, 1965, Ser. No. 508,308
8 Claims. (Cl. 271—74)

This application is a division of my prior copending application entitled "Veneer Sorting and Stacking Machine" Serial No. 278,558 now Patent No. 3,227,275, filed May 7, 1963.

This invention relates to a device for the grading, sorting and stacking of a material, and specifically relates to a device for grading, sorting and stacking of wood veneer.

It is the practice in grading and sorting wood veneer to place the veneers on a conveyor that carries them past a number of bins or boxes. These bins represent different grades of veneer. A number of people stand alongside of the conveyor opposite the bins grading and placing the veneer into an appropriate bin. The method is awkward and cumbersome since the individual both grades and sorts veneer, and the method is also inefficient since a great portion of the grader's time is devoted to removing the veneer from the conveyor rather than to grading the veneer.

An object of this invention is to provide a device which will allow the grader to devote his time and attention to grading the material instead of sorting and stacking it.

Another object of this invention is to provide a device which will sort and stack the veneer material after it has been graded by the individual.

An object of this invention is to provide a device which will place a sheet of veneer material with a stack of veneer material that is of the same grade.

It is a further object of this invention to provide a device which will stack the material in an orderly pile.

These and other objects and advantages will become manifestly clear to those skilled in the art when taken in conjunction with the detailed description and drawings, wherein.

Figure 1:
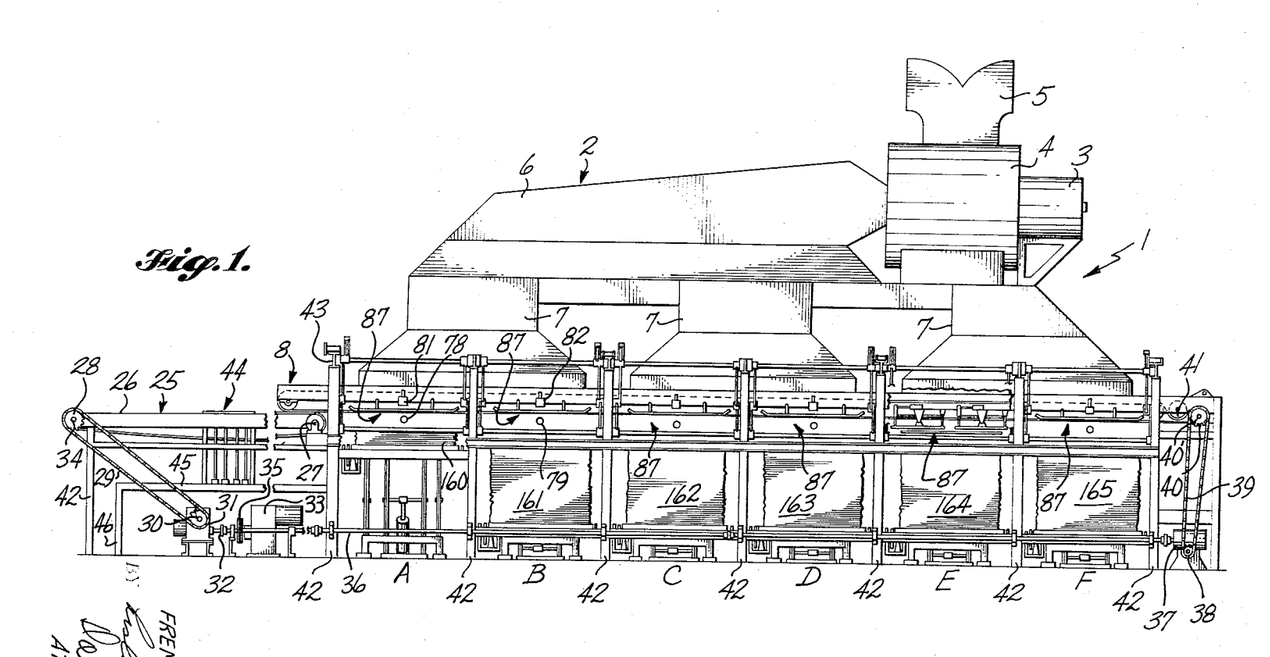
FIGURE 1 is a side elevation of the machine.
Figure 2:
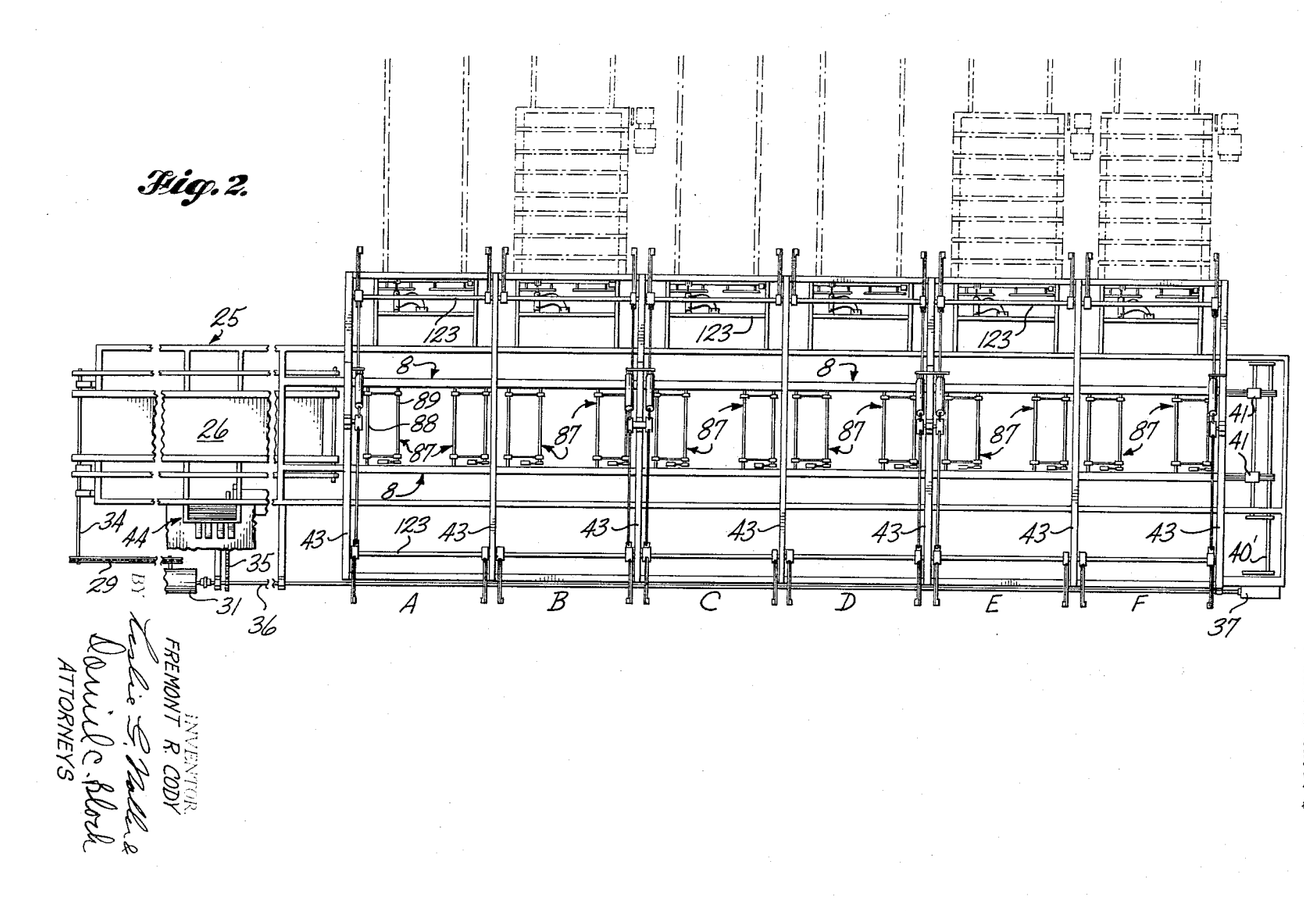
FIGURE 2 is a top plan view of the machine with the hood removed to show internal structure.
Figure 3:
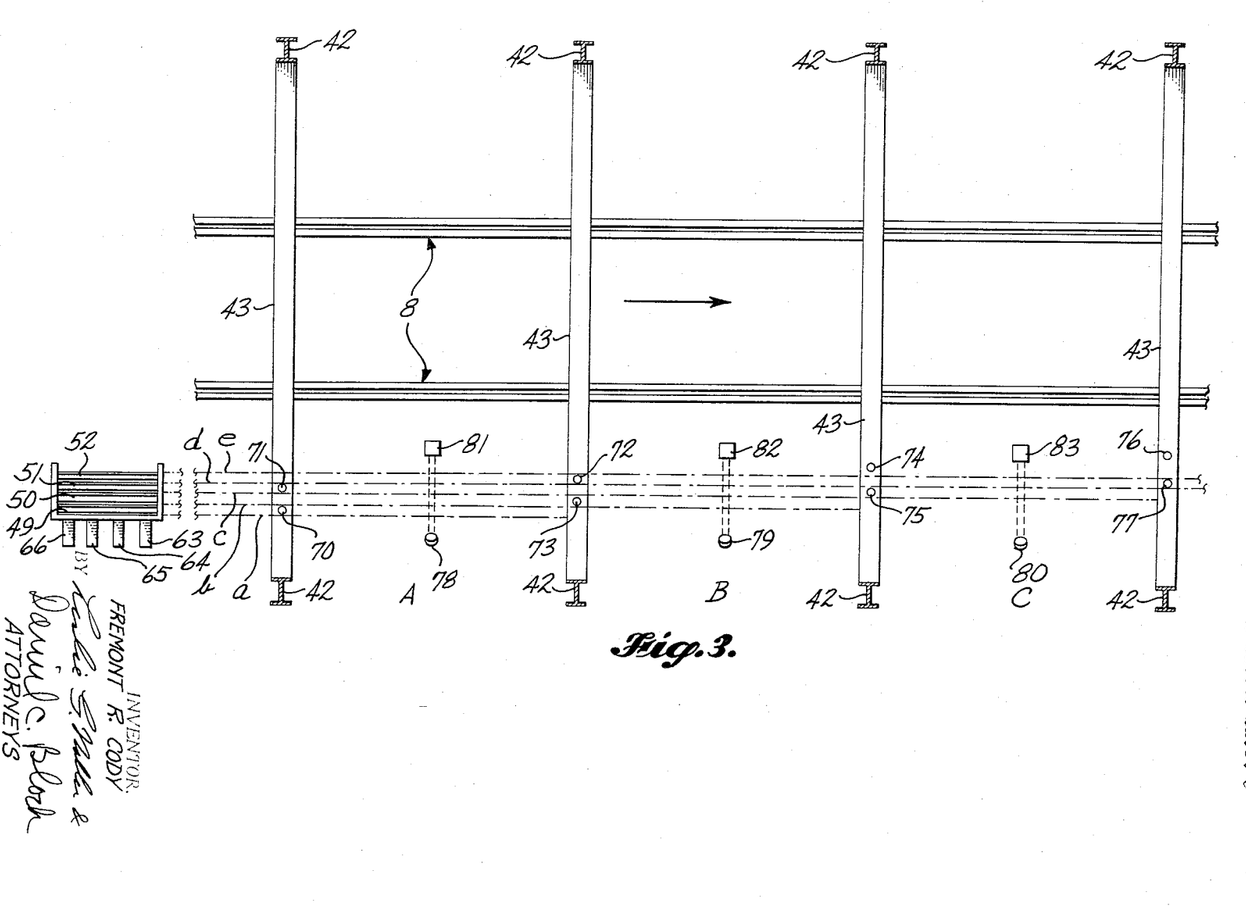
FIGURE 3 is a diagrammatic top plan view with details removed to show the relationship of the various grading stops at the grading station with the targets on the bins of the machine.

Referring to the drawings, the sorting and stacking assembly is generally indicated at 1 in FIGURES 1 to 3 inclusive. The sorting and stacking assembly 1 generally comprises a vacuum hood system 2 including a power source or motor 3 that drives a fan 4. The fan 4 is provided with an exhaust conduit 5 and an intake hood 6 which functions as a header for the vacuum conduits 7 connected to the conveyor system 8.

The sorting and stacking machine 1 is supported by a plurality of vertically spaced apart support beams 42 and a plurality of horizontal cross support beams 43 that divide the sorting and stacking machine 1 into a plurality of bins indicated at A, B, C, D, E and F. The respective bins are adapted to receive stacks of graded veneer indicated at 160, 161, 162, 163, 164 and 165. The veneer sheets can have widths of 48" or 24".

The veneer sorting and stacking assembly 1 is driven by a power source 33 that drives a shaft member 36 by a chain 35. One end of the shaft 36 is connected to a shaft 32 of a reduction gear 31 which drives shaft 34 by a chain 29 connected between sprockets 28 and 30. The shaft 34 is connected to pulleys or the like on a conveyor belt 26 that operates the feed mechanism generally indicated at 25.

The other end of the shaft 36 is connected to another reduction gear 37 that drives a sprocket 38 and chain 39 to rotate the sprocket 40 and shaft 40'. The shaft 40' in turn is connected to pulleys or the like to drive the belts 9, 10 on the conveyor system 8. The conveyor system 8 is provided with secondary idler pulleys 41 for the purpose of maintaining the proper tension on the belts 9, 10.

Figure 7:
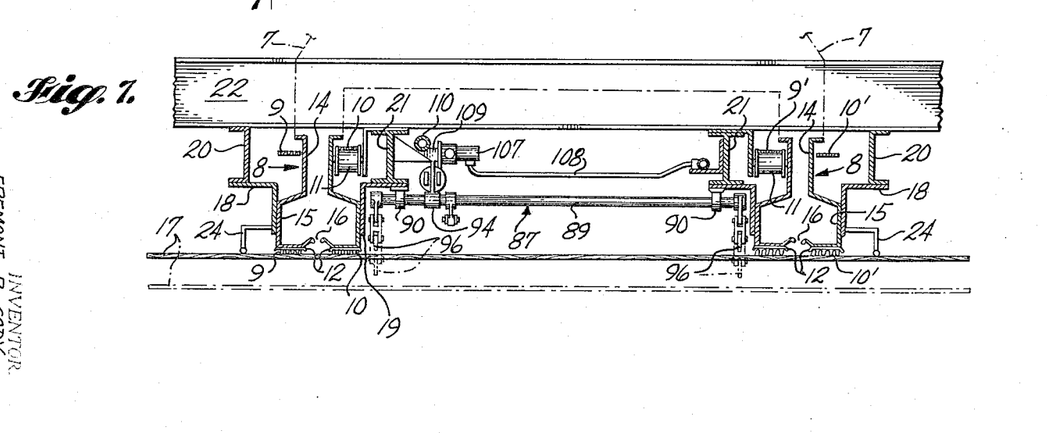
FIGURE 7 is a cross-sectional view of the kicker bar apparatus taken on line 7—7 of FIGURE 6.

Referring now to FIGURE 7, the conveyor system 8 is shown in more detail. The conveyor system 8 is generally comprised of a conduit 13 having a neck portion 14 connected to the hood 6 by vacuum conduit 7 to pull air through the conduit 13. The conduit 13 is provided with an enlargement 15 on the end thereof. Intermediate the bottom portion of the conduit 13 is provided a slit or opening 16 to provide an opening for the vacuum conduit 7 to conduct air therethrough. Belts 9 and 10 are provided on each side of said slit 16 and are rotated by power source 33 connected to the reduction gear 37. It should be noted that the belts 9 and 10 run the entire length of the veneer and stacking assembly 1 between the pulley members 40' and pulleys 11. The belts 9 and 10 slide along the lower surface of the enlargement 15 on slide members 12 properly secured to the conduit 13. The belts 9 and 10 are held against member 12 by a vacuum that is conducted through small openings (not shown) through the bottom surface of enlargement 15 and slide members 12.

The conduit system 8 is properly supported by I-beams 22 extending across the support structure and are welded or otherwise secured thereto by support beams 18, 19, 20, 21 and 23. On the outside of the conveyor system 8 is secured a safety rod 24 bent at right angles and extending downwardly to approximately the level of the belts 9 and 10 for a purpose to be hereinafter described. Accordingly, when the veneer 17 is placed onto the conveyor system 8, the vacuum will maintain it against the belts 9 and 10 and at the same time the belts 9 and 10 will be traveling in a direction to convey the veneer 17 to the proper bin.

As noted previously, the feeding mechanism 25 is powered by the motor 33 and reduction gear 31 which drives a chain 29 extending to a shaft 34. The shaft 34 is connected to pulleys or the like and rotate or turn a belt 26 connected between pulleys on the shaft 34 and pulleys on shaft 27. Intermediate the ends of the feeding mechanism 25 is a grading station indicated generally at 44.

Referring now to FIGURES 1 and 3 to 5 inclusive, the grading station 44 is supported by member 46 which is connected to a platform 45 on which an operator stands to grade the various veneer sheets that are fed into the feeder 25. Extending between the platform 45 and a horizontal support beam 48 is a leg member 47 to support the upper portion of the grader station 44.

Figure 4:
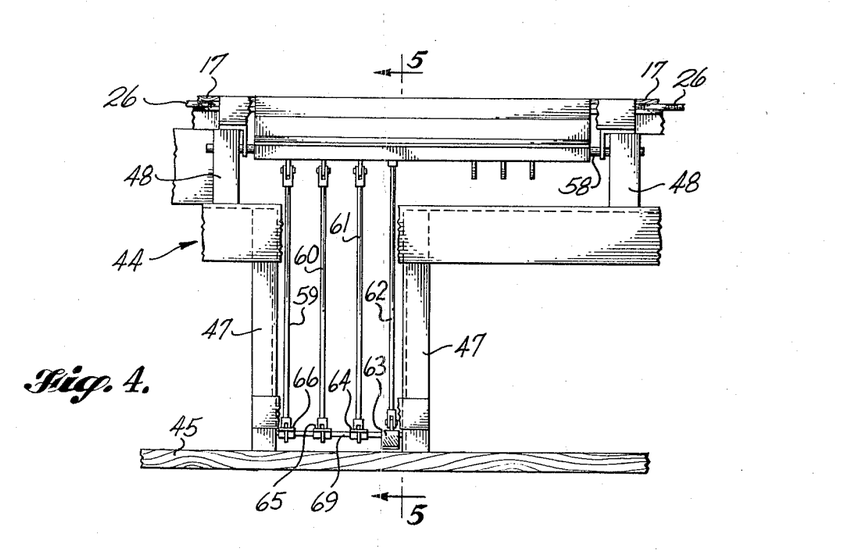
FIGURE 4 is a side elevation, partly in cross-section, of the grading station.
Figure 5:
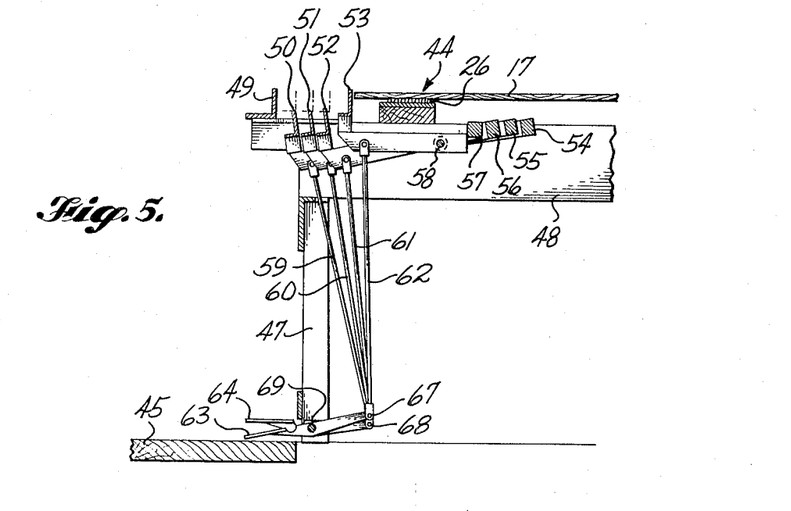
FIGURE 5 is a cross-sectional view of the grading station taken on line 5—5 of FIGURE 4.

The grading station 44 comprises a stationary grader station 49 and a plurality of movable grader stations indicated at 50, 51, 52 and 53. The movable grader stations are all pivoted on a shaft 58 by arms 54, 55, 56 and 57. The outboard ends of the arms 54, 55, 56 and 57 are all connected to rod members 59, 60, 61 and 62 which connect the arms to foot pedals indicated at 63, 64, 65 and 66. The foot pedals are all pivotally connected to a shaft member 69 so that when one of the foot pedals, such as 63, is depressed, it will rotate about shaft 69 and extend arm member 57 upwardly by pivot pin 67, connecting rod 62 and pedal 63. In this manner, the operator can align the veneer 17 so that it will be deposited in one of the respective bins.

Figure 8:
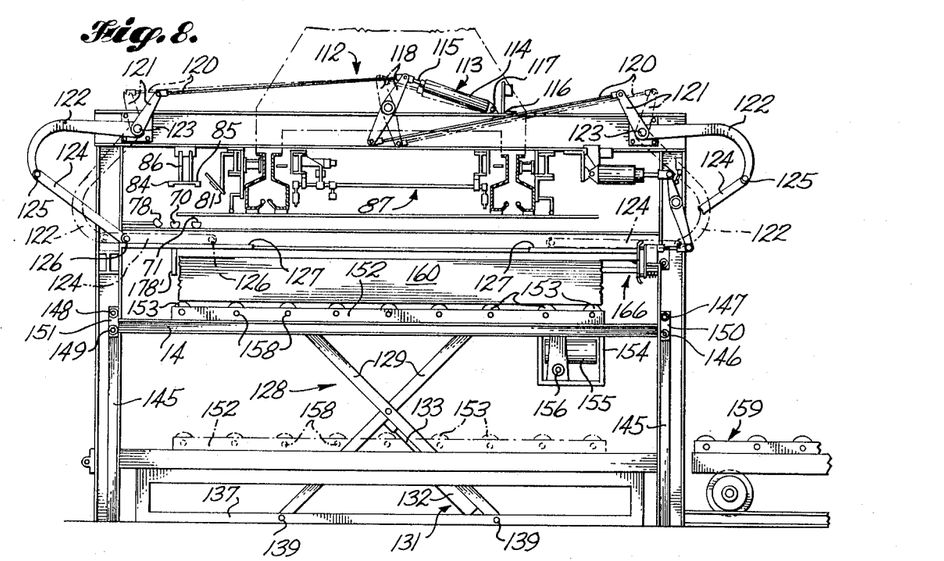
FIGURE 8 is a side view, partially in cross-section, showing a typical bin or pocket.

By aligning the veneer 17 with one of the grade stations 49, 50, 51, 52 or 53, the veneer 17 will be in line with a detector mechanism in the form of light sources 70 and 71, 72 and 73, 74 and 75, or 76 and 77, but not by way of limitations since limit switches or a memory system can be adapted to actuate the ejector mechanism 87. These lines are generally indicated at *a, b, c, d, e,* so that the veneer 17 can be ejected by the ejector mechanism 87 into a respective bin. Accordingly, if a veneer 17 having a 48″ width is to be ejected into bin A, the operator will align the edge of veneer 17 with the stationary grader station 49. This will allow the conveyor system 8 to move the veneer 17 downstream. When the light source 70 and 71 is traversed by the leading edge of veneer 17, photoelectric cells 84 and 85 supported by a support member 86, as shown in FIGURE 8, will be activated. Accordingly, when the trailing edge of veneer 17 passes the light source 70 and 71, the ejector mechanism 87 will be activated and will knock the veneer 17 down onto the veneer stack 160. In this manner, the operator can align the veneers 17 with any one of the respective bins that it is desired to place the veneer in. It should be noted that in order for the veneer to be ejected into a bin, both light sources 70 and 71 or 72 and 73, etc., must be interrupted simultaneously. In other words, if a veneer 17 passes over light source 71 but does not interrupt light source 70, the mechanism 87 will not eject the veneer 17 into bin A but will allow it to pass on down to another bin.

If 24″ width veneer sheets 17 are being graded, the operator merely turns a master switch, not shown, that activates light source 78 and photoelectric cell 81 and deactivates light source 70 and 71 and photoelectric cells 84 and 85. The operator will align the edge of the 24″ veneer 17 with stationary grade station 49. This will allow the conveyor system 8 to move the veneer 17 downstream. When the light source 78 is traversed by the leading edge of veneer 17, photoelectric cell 81 will be activated. Accordingly, when the trailing edge of veneer 17 passes light source 78, the ejector mechanism 87 will be activated and knock the veneer 17 down onto the right side of stack 160. When the next 24″ veneer 17 advances down the conveyor system 8, it will be ejected by mechanism 87 when the leading edge traverses light source 78 to knock veneer 17 down onto the left side of stack 160.

Figure 6:
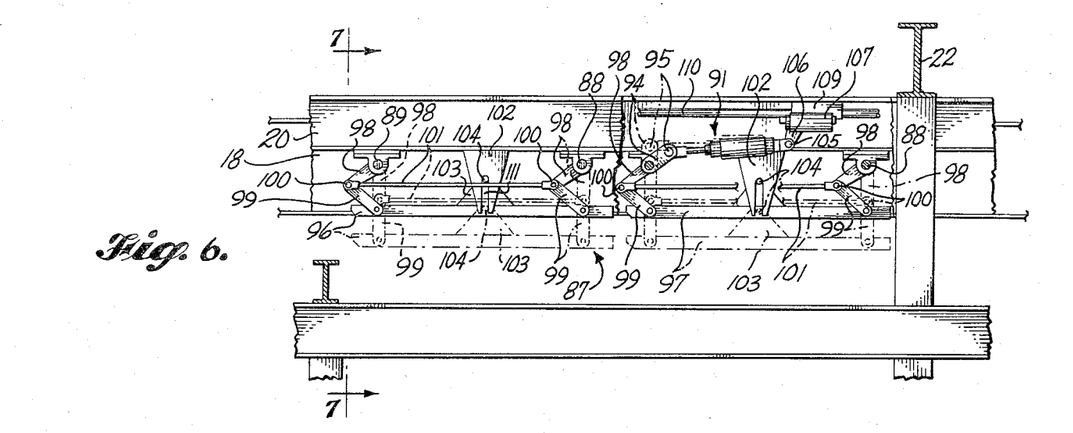
FIGURE 6 is a side elevation, partially in cross-section, of the kicker bar apparatus.

Referring now to FIGURES 6 and 7, the ejector mechanism 87 is shown in detail. The ejector mechanism 87 generally comprises a pair of shafts 88 and 89 extending across each pin. Moreover, there is an ejector mechanism 87 on each end of each bin as shown in FIGURE 2. The shafts 88 and 89 are connected to the support structure 18 and 20 by a connecting bearing 90.

The ejector mechanism 87 is actuated by a hydraulic motor 91 that includes a cylinder 92 pivotally mounted on a support 106 by a pivot pin 105. The cylinder 92 is provided with a piston therein, not shown, and a piston rod 93 connected to the piston. The piston rod 93 is pivotally connected to a connecting link 94 by a pivot pin 95 which connects the shaft 89 to the power source 91. Accordingly, when the hydraulic motor 91 is actuated and the piston rod 93 is ejected from the cylinder 92, the connecting link 94 serves to rotate the shaft 89. The shaft 88 is rotated with the shaft 89 through the mechanism of a connecting structure including connecting links 98 and 99 and a connecting rod 101. The connecting rod 101 is pivotally connected by a pivot pin 100 to the links 98 and 99. Accordingly, when the shaft 89 is rotated by the power source 91, the links 98 and 99 will seek a vertical position as shown in phantom lines in FIGURE 6 so that the elongated bars 96 and 97 will kick or eject the veneer 17 downwardly. Intermediate the ends of the connecting rod 101 is provided a support member 102 having a slit 111 therein. The slit accommodates a pin 104 which connects a stabilizer 103 thereto so that the ejector bars will be insured of moving in a vertical direction only.

The power source or motor 91 is actuated by air pressure or the like from a solenoid valve 107 which is supported by a support member 109. Air is supplied to the solenoid valve 107 by an air line 110 which runs the entire length of the sorting and stacking assembly 1. As shown in FIGURES 6 and 7, another line 108 runs the length of the stacking and sorting machine which carries electrical wiring to actuate other air mechanism in the line as hereinafter described.

The solenoid valve 107 is operated by the photoelectric system, such as shown at 78 and 81, and also 70 and 71 and 84 and 85.

Figure 9:
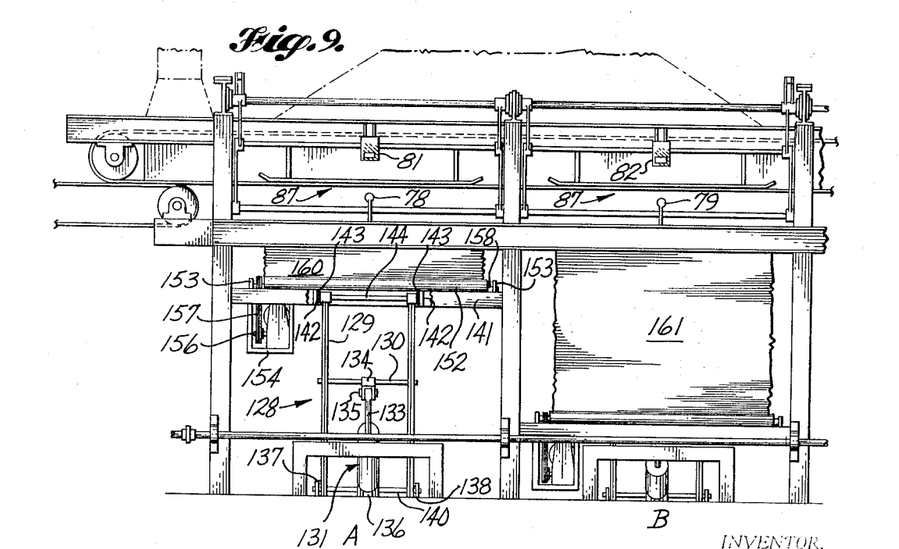
FIGURE 9 is an end elevational view of the first two bins of the machine.

Referring now to FIGURES 8 and 9, it is noted that each bin is provided with a conventional stacking mechanism generally indicated at 128. The stacking mechanism 128 is comprised of supporting posts 129 connected to a shaft 130 at their mid-section so that the supporting posts 129 in effect cross each other. The lower end of each post is provided with a pin 139 which connects a roller 138 into a track 137. The upper end of said post 129 is also provided with a similar wheel structure 143 mounted on pins 144 and mounted in a track 142.

The track 142 is mounted in a platform structure indicated at 141 which receives the veneers indicated at 160 in FIGURE 9. The platform 141 is provided with a table 152 having rollers 153 mounted thereon on pins 158. On one side of the platform 141 is mounted a motor means 155 which is properly supported by support member 154. The motor is provided with the usual shaft 156 which mounts a sprocket wheel which drives a chain 157 mounted thereon. The other end of the endless chain 157 is connected to one of the rollers 153 so that the load of veneer 160 can be moved laterally out of the bin onto a cart 159 when the bin gets full.

Platform 141 may be raised or lowered by a suitable power source 131 which includes a cylinder 132 having a piston, not shown, and a piston rod 133 extending therefrom. The piston rod 133 is provided with a yoke 134 which carries a pivot pin 135 that connects the piston rod 133 to the shaft 130. The lower end of the hydraulic motor means 131 is properly supported on a support member 136. Platform 141 may be raised or lowered by simply extending or retracting the piston rod 133 from the cylinder 132. It should be noted that the platform 141 will be lowered in increments. This is brought about by a photoelectric cell, not shown, extending across the bins. As the stack 160 or 161 increases in size, the light beam extending from the light source to the photoelectric cell will be traversed and the motor 131 will be actuated to lower the platform 141 an increment when the light source is cleared by the veneer 17. Moreover, it should be noted that the outer ends of the platform 141 are secured to a guide bar 151 that slides or rolls in a guide track 145 in the framework. The guide bars 151 are provided with rollers 146, 147, 148 and 149 to provide for ease in rolling the platform up and down.

Figure 10:
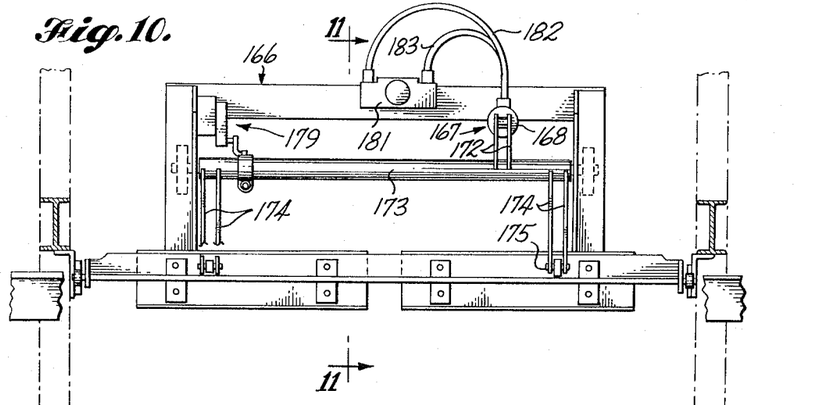
FIGURE 10 is a side elevational view, partially in cross-section, of the pile straightener.
Figure 11:
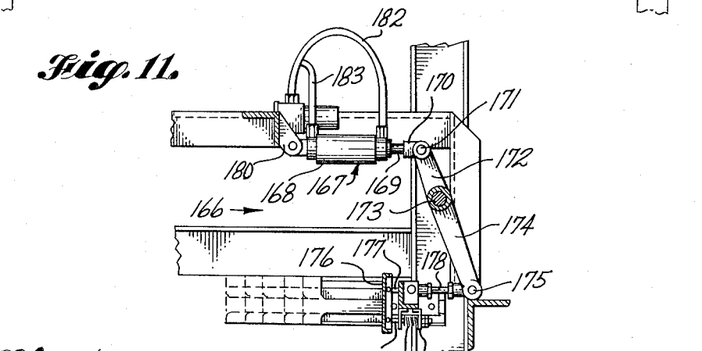
FIGURE 11 is a cross-sectional view of the pile straightener taken on line 11—11 of FIGURE 10.

Referring now to FIGURES 8, 10 and 11, a load bumper mechanism 166 is shown that functions simultaneously with the ejector mechanism 87. The bumper mechanism 166 generally comprises a hydraulic motor 167 having a cylinder 168 and a piston, not shown, therein with a piston rod 169 extending from the cylinder 168. On the outer end of the piston rod 169 is mounted a yoke 170 which connects a pair of links 172 thereto by a pivot pin 171. The other end of the links 172 is connected to a shaft 173 that extends from one side of the platform to the other.

As shown more clearly in FIGURE 10, a plurality of links 174 are also connected to the shaft 173 but spaced from the links 172. Both of the links 174 and 172 are rigidly connected to the shaft 173 and rotate therewith. The opposite end of the links 174 is connected to a rod 178 by a pivot pin 175. The rod 178 is attached to a bumper shoe 176 through the mechanism of supports 177. The supports 177 are nothing more than a pair of spaced rods that slide through a supporting mechanism 177' mounted to the frame. As shown in FIGURE 11, the bumper pad 176 is adapted to be ejected away from its inboard position out into the phantom line position to bump or straighten the pile of veneer that is in front of it and be returned by spring 177''. In order for the bumper pad 176 to be ejected, the hydraulic motor 167 receives air from hoses 182 and 183 which are connected to a solenoid valve 181. The solenoid valve 181 is actuated by the same photoelectric mechanism that actuates ejector mechanism 87 and receives air from hose 110. A time delay mechanism, not shown, is used to allow time for the veneer 17 to fall onto the stacks in the various bins. The hydraulic motor 167 is adapted to move the bumper pad 176 out by a plurality of increments so that as the pad 176 strikes the veneer sheets, they will become relatively straight. In order for the veneer stack 160 to remain on the table 152, a support rod 178' is provided diametrically opposite the bumper mechanism 166 as indicated in FIGURE 8. In this manner, the veneer stack is uniformly stacked on top of the table 152.

Referring now to FIGURES 2 and 8, it is noted that each bin is provided with a veneer safety catcher mechanism generally indicated at 112. The veneer safety catcher mechanism 112 is supported above each bin to catch the veneer sheets as they are ejected into the bins during the period when the load 160 is removed or unloaded from the platform 141. This is necessary to keep the veneer sheets from being randomly ejected into the bins.

The veneer safety catcher mechanism 112 generally comprises a hydraulic motor 113 having a cylinder 114 secured to a support 116 by a pivot pin 117. The hydraulic motor 113 is provided with a piston, not shown, within cylinder 114 and a piston rod 115 extending therefrom. The piston rod 115 is pivotally connected to a lever mechanism 118 that is rigidly connected to a shaft 119 properly supported on a support member. The opposite end of the lever 118 is pivotally connected to rods 120 which are connected at their terminal ends to another lever 121. The levers 121 are connected to shafts 123 which are properly mounted on the support frames. Rigidly connected to the shaft 123 are curved lever arms 122 that are pivotally connected at 125 to another arm member 124 that rides in a track 127 within the framework. The arm members 124 are provided with rollers 126 on their terminal ends so that the arm member 124 can easily ride within track 127.

Accordingly, when the veneer load 160 is to be removed and placed onto the cart 159, the hydraulic motor 113 is actuated and the piston rod 115 is extended as shown in phantom lines in FIGURES 8. In this manner the lever 118 will be rotated along with the shaft 119 to extend the rods 124 inwardly of the bin to catch any veneer sheets that are ejected into that particular bin. The hydraulic motor 113 is actuated by an elevator lower limit switch, not shown, situated on the framework near the track 145 at the lower terminal end of the travel of the platform 141. Therefore, when the platform 141 reaches its lower limit, the limit switch will be actuated and the veneer catcher mechanism 112 will automatically be ejected into the path of any dropping veneer sheets so that the veneer load can be removed and placed onto the cart 159. It should be noted, as viewing from FIGURE 2, that the shafts 123 extend all the way across each bin so that an arm member will extend into the path of the dropping veneer sheet on both ends thereof.

Figure 12:
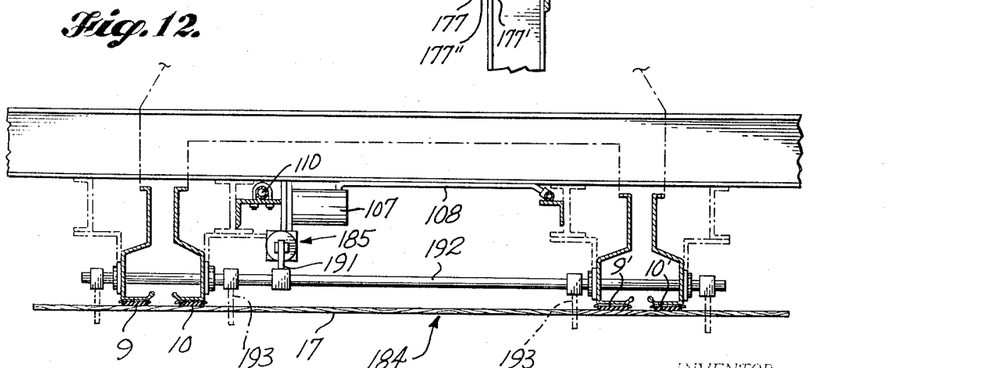
FIGURE 12 is a cross-sectional view of the end of the conveyor system illustrating the kicker bars for the removal of scrap material.
Figure 13:
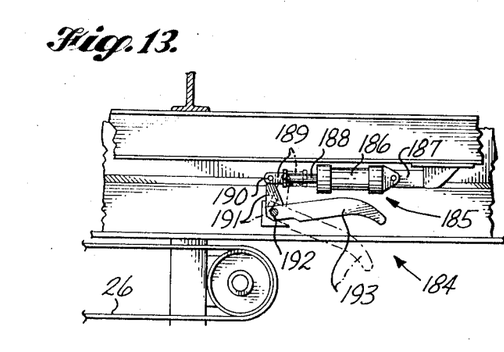
FIGURE 13 is a side elevational view of the end of the conveyor illustrating the kicker bars for removal of scrap material.

Referring now to FIGURES 12 and 13, the ejector mechanism 184 is shown in detail. The ejector mechanism 184 functions to kick off or eject any veneer scraps into a trough positioned in front of bin A.

The ejector mechanism 184 generally comprises a hydraulic motor 185 including a cylinder 186 properly supported by a support member 187. The cylinder 186 has a piston, not shown, therein and a piston rod 188 extending therefrom. Connected to the outboard end of the piston rod 188 is a yoke member 189 having a pivot pin 190 extending therethrough which connects a connecting link 191 thereto. The connecting link 191 is connected to a shaft member 192 that extends across the entire system. Rigidly connected to the shaft member 192 are a plurality of dogs 193 that are adapted to rotate with the shaft member 192. The hydraulic motor system 185 is adapted to receive air from a solenoid valve 197 having an air pressure line 198 connected thereto.

The ejector mechanism 184 is adapted to be actuated by a limit switch, not shown, if any waste material is carried onto the feed belt 26.

In operation, the veneer and stacning mechanism 1 is actuated by turning on the power source 33. This will actuate the shaft 36 and 32 which turns the feed mechanism 25 and the conveyor system 8. Moreover, the motor 3 is turned on which will actuate the fan 4 to draw a vacuum on the conveyor system 8 through the conduits 6 and 7.

The grading and sorting operator then stands on the platform 45 adjacent the grading mechanism 44. The veneer to be graded and sorted is then placed onto the belt 26 of the feeding mechanism 25 from a conveyor system, not shown.

As the veneer sheets come adjacent to the operator and adjacent the grading station 44, the operator will grade each sheet that comes by him.

As the veneer sheet comes adjacent the station 44, the operator will place it adjacent one of the stations 49, 50, 51, 52 or 53, depending on which bin the veneer will be placed in. If the veneer sheet is to be placed in bin A, the operator simply places the veneer 17 adjacent the grading station 49. This is done by placing the longitudinal edge of the veneer adjacent the station 49. This will place the edge of the veneer on line $a$ as illustrated in FIGURE 3. The veneer 17 then passes from the feeding belt 26 to the conveyor system 8, where it is picked up by the vacuum system and is transported longitudinally by the belts 9, 10 and 9', 10' which affix the veneer 17 at each end thereof.

As the veneer 17 approaches bin A, the light beams from light source 70 and 71 will be traversed. When the veneer sheet 17 passes the light beam from the light source 70 and 71, the ejector system 87 will be actuated.

Air then is allowed to flow into the hydraulic motor 91 which will actuate the linkage that connects the bars 96 and 97 thereto. This will move the bars 96 and 97 directly downwardly and will contact the veneer 17 and knock it off the belts 9, 10 and 9′, 10′, as shown in phantom lines in FIGURES 6 and 7. If the ends of the veneer 17 tend to curve upwardly due to the striking of the ejector system 87 against it, the safety rods 24 will be contacted and will prevent the ends of the veneer from being ejected up into the other system on the bins. This will insure that the veneer 17 falls flat into the bin A.

If the veneer to be graded is directed to the bin designated at B, the operator will merely place his foot on the pedal 66 and raise the grader station 50 and align the edge of the veneer therewith. This will align the edge of the veneer on line b of FIGURE 3 which will bypass the light source 70 and 71, but will actuate the light source 72 and 73 and will eject the veneer into bin B in the same manner as described with respect to the procedure followed to place a veneer 17 in bin A.

This procedure is repeated for each one of the bins. Accordingly, depending upon what grade the veneer is, the operator need only place his foot on the foot pedal to grade it and align it up with the proper line to be contacted or traversed by the light source. As the veneers drop into their respective bins, such as for example, bin A, the motor mechanism on the stacking mechanism will be lowered by increments by a photoelectric system, not shown. As the stack 160 (see FIGURE 8) is lowered down by increments, the load bumper mechanism 166 will be actuated to maintain the veneer stack 160 in a neatly stacked pile.

When one of the bins gets a load or becomes full, the lower portion of the platform 141 will strike a limit switch, not shown, which will automatically actuate the veneer safety catcher mechanism 112 and will actuate motor 113 which will eject the catcher bar 124 into the path of any veneer that will further drop. Simultaneously therewith, the motor means 155 is actuated and the load 160 is rolled laterally out of the bin A and loaded onto a cart 159. As the load 160 is removed from bin A, another limit switch, not shown, is actuated which will raise the platform 141 up to its uppermost position. Simultaneously therewith the motor mechanism 113 is actuated and the bars 124 are removed from the path of the dropping veneer. If any veneer is resting upon the bar 124, it will merely drop onto the table 152 which is mounted on top of platform 141.

In this manner the veneer graded into their respective bins can be loaded and unloaded automatically without any assistance from the operators. With the operation of the stacking and sorting mechanism 1 only one operator need be present since he aligns the respective veneers with the grading mechanism 44, which then will automatically be ejected into the proper bin.

If the operator detects a piece of scrap veneer, the ejector system will be actuated by a limit switch, not shown, to actuate motor mechanism 185 that will eject the veneer into a trough, not shown.

It should be noted that the electrical circuit employed with the operation of this apparatus is of a conventional or well-known type and forms no part of the present invention. Accordingly, a full detailed description thereof is deemed unnecessary.

Figure 14:
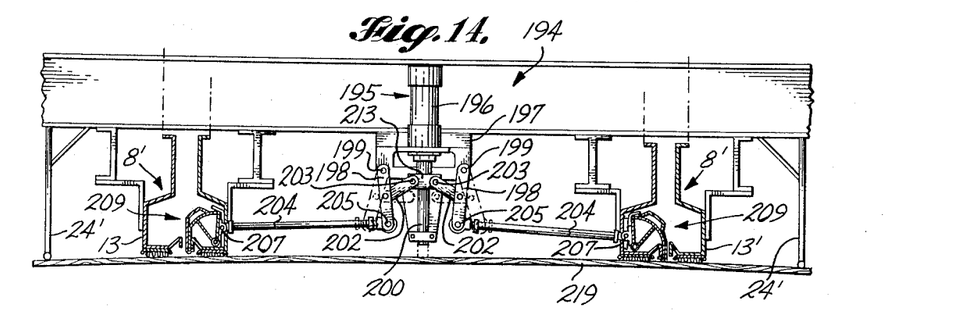
FIGURE 14 is a cross-sectional view illustrating a modified kicker mechanism for removing the veneer from the conveyor.
Figure 15:
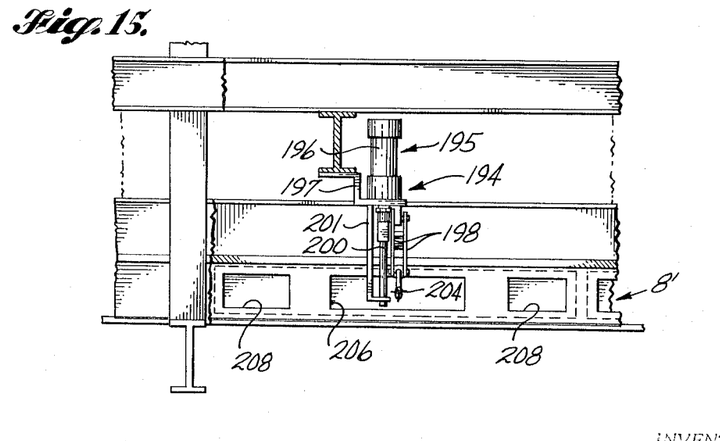
FIGURE 15 is an elevational view, partly in cross-section, of the modified kicker bar structure illustrated in FIGURE 14.
Figure 16:
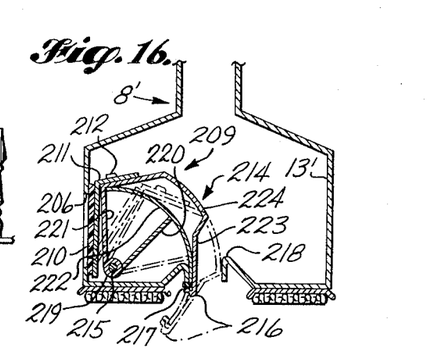
FIGURE 16 is a detailed cross-sectional view of the kicker bar structure illustrated in FIGURE 14.

Referring now to FIGURES 14 through 16, a modified ejector system 194 and a modified conveyor system 8′ is illustrated.

The conveyor system 8′ differs slightly from the conveyor system 8 as shown in FIGURE 7 in that the inboard sides of the conduit member 13′ are provided with openings 206 and 208, each spaced from each other. Moreover, the safety rod 24′ is an elongated rod which is tied to one of the cross support beams.

The ejector system 194 generally comprises a hydraulic motor 195 including a cylinder 196 having a piston therein, not shown. Extending from one end of the cylinder 196 is a piston rod 200. The cylinder 196 is properly supported by a support member 197. A pair of links 198 are pivotally connected to the support member 197 by pivot pins 199. Pivotally connected to the links 198 are another pair of links 202 connected between the links 198 and a collar structure 213 which is rigidly mounted on the piston rod 200. The outer ends of the links 198 are pivotally connected to push rods 204 by pivot pins 205. In this manner, the piston rod 200 is ejected from the cylinder 196 to move collar member 213. This will move the links 198 outwardly as shown in phantom lines in FIGURE 14.

The outer ends of the push rods 204 are pivotally connected to a closure device 209 by pivot pins 207.

As seen more clearly in FIGURE 16, the opening 206 is closed by a gasket or sealing member 210 which runs the entire length of the bin and also functions to close openings 208. The gasket or packing member 210 is bonded or otherwise connected to a support member 211. The support member 211 is connected to an arcuate member 214 by a screw or bolt 212.

The arcuate member 214 comprises an elongated pipe 219 pivotally mounted on a rod 215. Connected to pipe 219 is a pair of wings 220 and 211 that extend upwardly at an angle with respect to each other. The upper end of wing 220 is connected to an arc support member 222. The upper end of wing 221 is bent to form an arcuate projection member 223 having a hook structure 216 on its outer end. The hook structure 216 connects one end of the arc support member to member 223 and also engages a projection 217 on the conduit 13′. The other end of support member 222 is connected to member 223 by bolt 212. The member 223 is bent at 224 to provide an enlargement to engage with the wall of the slit 218 in conduit 13′ to close the slit 218 upon actuation of the closure device 209.

The operation of the modified ejector mechanism is as follows:

The ejector mechanism 194 is actuated substantially in the same manner as the ejector mechanism 87 shown in FIGURE 7, that is, when the light source 70 and 71 and 78 and 81 are traversed the mechanism will be actuated.

When the light source is traversed, the motor mechanism 195 will be actuated and the piston rod 200 will be ejected. This will move the collar 213 as shown in the phantom lines in FIGURE 14. This will eject or move the push rods 204 laterally away from the center line of the mechanism. This will rotate the closure device 209 about the rod 215 and close the slit 218 on the bottom of the conveyor system 8′ by engagement of portion 224 on member 223 with the wall of slit 218 and at the same time will open the openings 206 and 208. The end of the hook member 216 will then strike the veneer 219 and will eject it therefrom. As the openings 206 and 208 become open, the vacuum on the conveyor system 8′ will be terminated through the slit 218 and will then flow through the openings 206 and 208. This will allow the veneer 219 to be more easily ejected from the conveyor belts. If the ends of the veneer 219 tend to be ejected upwardly due to its resiliency, the ends of veneer 219 will strike safety rods 24′ and will insure that the veneer 219 falls in a straight line onto the stack in its bin.

While specific details of preferred embodiments have been set forth above, it will be apparent that many changes and modifications may be made therein without departing from the spirit of the invention. It will therefore be understood that what has been described herein is intended to be illustrative only, and is not intended to limit the scope of the invention.

What is claimed is:

1. In combination: vacuum conveyor means for sheets and means for removing said sheets from said conveyor means;
  said vacuum conveyor means including elongated conduit means having spaced side walls and a lower wall and belt means,
    said conduit connected to a vacuum system and provided with an elongated slit in its lower wall and at least one opening through at least one of said side walls,
    said belt means positioned in sliding contact along said conduit adjacent said slit;
  said removing means including motor means, linkage means, and closure means,
    said motor means operatively connected to said closure means by said linkage means,
    said closure means positioned to open and close said openings responsive to the action of said motor means.

2. The combination as set forth in claim 1 wherein said closure means includes an extension means obstructing contact between articles positioned adjacent said slit and said belt means when said closure means opens said openings with said extension means being retracted from said obstructing position when said closure means opens said openings through the action of said motor means.

3. The combination of claim 2 wherein said extension means is provided with an enlargement thereon to to close the slit in said conduit means and said closure means is pivotally mounted upon a rod mounted within said conduit means.

4. The combination of claim 3 wherein said extension means is arcuate.

5. The combination of claim 2 wherein said extension means is arcuate.

6. The combination of claim 1 wherein said conduit means is provided with a neck portion and a header portion provided with said slit on its lower end with said belt means on each side of said slit riding on a slide mounted on said header portion.

7. The combination as set forth in claim 1 wherein said closure means is pivotally mounted upon a rod mounted within said conduit means.

8. A method of conveying and ejecting sheet-like material from a vacuum conveyor system having belt means positioned along the lower surface of a conduit means and a vacuum pulling through slits in the lower surface of said conduit means holding said sheet-like material adjacent said belt means, comprising;
  diverting said vacuum from said slits through openings in said conduit means,
  simultaneously closing said slits and ejecting said sheet-like material away from said belt means.

References Cited by the Examiner

UNITED STATES PATENTS 2,973,960  3/1961  Buccicone _____________ 271—74

M. HENSON WOOD, JR., *Primary Examiner.*

R. A. SCHACHER, *Assistant Examiner.*